UNITED STATES PATENT OFFICE.

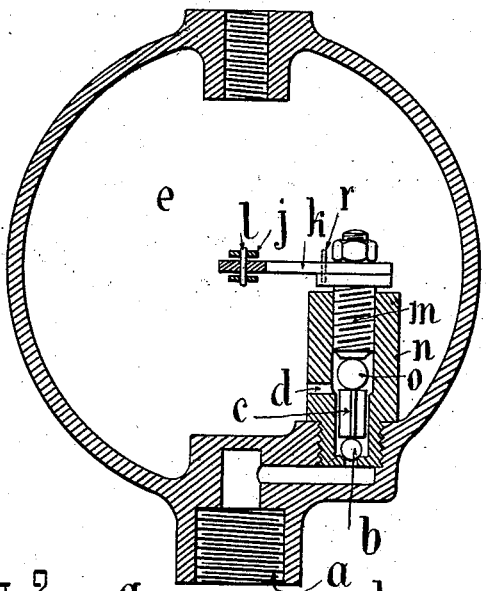
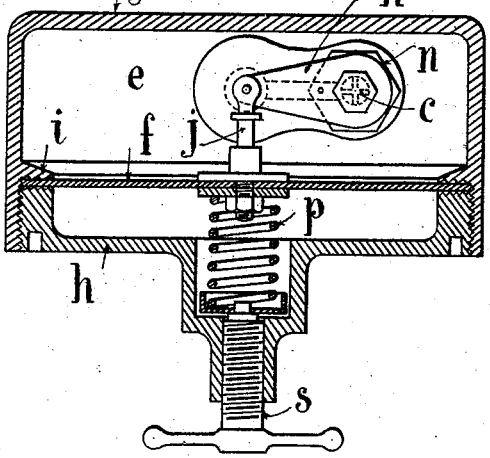

AUGUSTE GAUDET, OF PARIS, FRANCE.

PRESSURE-REGULATING DEVICE FOR GAS AND STEAM.

No. 915,587.      Specification of Letters Patent.      Patented March 16, 1909.

Application filed October 5, 1908. Serial No. 456,270.

*To all whom it may concern:*

Be it known that I, AUGUSTE GAUDET, a citizen of the Republic of France, residing at 33 Rue de Flandre, Paris, France, have invented certain new and useful Improvements in Pressure-Regulating Devices for Gas and Steam, of which the following is a specification.

This invention relates to an improved pressure-regulating device which can be employed for gas and steam and is so constructed that it has many advantages over pressure-regulating devices hitherto constructed.

The pressure regulating devices having valve flaps of ebonite soon fail to insure a precise and exact closing of the valve, owing to the rapid wearing away of the ebonite. The metal ball used in this apparatus to replace the ebonite flap valve possesses many advantages and always insures an exact closing of the valve. Moreover, the closing movement is rendered smoother and less abrupt, as it acts through the medium of a ball.

In the accompanying drawing in which the invention is illustrated. Figure 1 is a longitudinal section of the pressure-regulating device, Fig. 2 being a transverse section.

The gas or steam under pressure is introduced through the inlet $a$ and comes under the ball $b$ which it raises. This metal ball is made of steel but in cases where oxygen is employed it is made of nickel. After raising the ball $b$, the gas passes around the metal support $c$, which is of cruciform shape in cross section and passing through the opening $d$ enters the expansion chamber $e$. Having reached this the gas exercises pressure on the diaphragm $f$. This diaphragm is made of india-rubber and is fixed between the two parts $g$ and $h$ of the casing of the pressure-regulating device, cavities $i$ enabling it to be immovably fixed, this being effected by squeezing the material into the cavities. The diaphragm $f$ being put under tension by the pressure of the gas, forces the rod $j$ to follow it in its new position. The lever-arm $k$ connected with the rod by means of a pin $l$ causes the screw $m$ in the piece $n$ to turn, and in descending the screw exercises pressure on the ball $o$ which, through the medium of the support $c$ presses the ball $b$ on to its seat and prevents any subsequent introduction of gas.

The gas having expanded and escaped from the chamber $e$, the spring $p$ acts on the diaphragm $f$ and returns it to its first position, whereby the screw $m$ is caused to turn in the contrary direction through the medium of the rod $j$ and the lever arm $l$. The screw $m$ having been raised again, the ball $p$ can be raised once more and allow a fresh entry of gas. The screw $m$ is firmly connected with the lever arm $k$ by means of a pin $r$. Moreover the tension of the spring is regulated by a tightening screw $s$.

The ball $o$ which acts as an intermediary between the piece $c$ and the screw $m$ is chiefly intended to prevent the screw from being wedged on the cross shaped piece and thus to make the movement as smooth in the one direction as in the other.

What I claim and desire to secure by Letters Patent is:—

1. An automatic pressure regulator for gas and steam, comprising a casing provided with inlet and outlet openings, a flexible diaphragm in said casing, a ball valve for closing the inlet of said casing, a ball located above said ball valve, supporting means arranged between said balls, a member operatively connected with said diaphragm and acting through the medium of the ball to press the valve on its seat when the pressure on the diaphragm exceeds a predetermined amount and means for returning said diaphragm to normal position when the pressure is relieved.

2. An automatic pressure regulator for gas and steam comprising a casing with inlet and outlet openings, a flexible diaphragm mounted in the casing and provided with an adjusting screw and spring on one side, a ball valve adapted to admit the fluid under pressure to the casing, a ball located above the ball valve on a support resting on the valve and a screw operatively connected with the diaphragm and acting through the intermediate ball to press the valve on its seat when the pressure on the diaphragm exceeds a predetermined amount substantially as described.

In testimony whereof I have affixed my signature, in presence of two witnesses.

AUGUSTE GAUDET.

Witnesses:
  PAUL COULOMB,
  HANSON C. COXE.